US010894452B2

(12) United States Patent
Garn et al.

(10) Patent No.: US 10,894,452 B2
(45) Date of Patent: Jan. 19, 2021

(54) MOUNTING MEMBER FOR AN AIR MAINTENANCE TIRE

(71) Applicant: The Goodyear Tire & Rubber Company, Akron, OH (US)

(72) Inventors: Benjamin Isaiah Garn, Norton, OH (US); Dinesh Chandra, Hudson, OH (US); Sagar Dilip Bafana, Akron, OH (US); Cheng-Hsiung Lin, Hudson, OH (US); Daniel Vojtko, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 599 days.

(21) Appl. No.: 15/811,751

(22) Filed: Nov. 14, 2017

(65) Prior Publication Data
US 2018/0141395 A1 May 24, 2018

Related U.S. Application Data

(60) Provisional application No. 62/425,840, filed on Nov. 23, 2016.

(51) Int. Cl.
*B60C 23/12* (2006.01)

(52) U.S. Cl.
CPC .......... *B60C 23/123* (2020.05); *B60C 23/135* (2020.05); *B60C 23/12* (2013.01)

(58) Field of Classification Search
CPC ..... B60C 23/12; B60C 23/123; B60C 23/135; B60C 19/086
See application file for complete search history.

(56) References Cited

U.S. PATENT DOCUMENTS

| 1,050,886 A | 1/1913 | Wetherell |
| 1,134,361 A | 4/1915 | Wetherell |
| 1,682,992 A | 9/1928 | McKone |
| 3,304,981 A | 2/1967 | Sheppard |

(Continued)

FOREIGN PATENT DOCUMENTS

| DE | 3433318 | 3/1986 |
| DE | 102007001279 | 7/2008 |

(Continued)

OTHER PUBLICATIONS

Chinese search report received by applicant dated Jun. 27, 2019.
EPO search report dated Mar. 20, 2018 and received by Applicant on Apr. 6, 2018.

*Primary Examiner* — Kip T Kotter
(74) *Attorney, Agent, or Firm* — Edward T. Kennedy

(57) ABSTRACT

A mounting member for an air maintenance tire is provided. The tire includes a sidewall that is formed with a groove for receiving an air tube and a recess for receiving at least one pneumatic connector that is in fluid communication with the air tube. The mounting member includes a plurality of layers, in which the layers are in stacked alignment with one another. The plurality of layers includes at least an axially outward layer and an axially inward layer. The mounting member is received in the recess and secured to the tire sidewall, thereby securing the position of the at least one pneumatic connector. A method of forming a mounting member for an air maintenance tire is also provided.

13 Claims, 10 Drawing Sheets

(56) References Cited

U.S. PATENT DOCUMENTS

| | | |
|---|---|---|
| 3,833,041 A | 9/1974 | Glad et al. |
| 4,922,984 A | 5/1990 | Dosjoub et al. |
| 5,052,456 A | 10/1991 | Dosjoub |
| 7,117,731 B2 | 10/2006 | Hrabal |
| 8,113,254 B2 | 2/2012 | Benedict |
| 8,875,762 B2 | 11/2014 | Hinque et al. |
| 8,915,277 B2 | 12/2014 | Hinque et al. |
| 8,985,171 B2 | 3/2015 | Hinque et al. |
| 8,991,456 B2 | 3/2015 | Gobinath |
| 9,205,712 B2 | 12/2015 | Lamgaday et al. |
| 9,272,586 B2 | 3/2016 | Durr |
| 9,333,816 B2 | 5/2016 | Durr |
| 9,387,737 B2 | 7/2016 | Welter et al. |
| 9,533,534 B2 | 1/2017 | Lamgaday |
| 2004/0112495 A1 | 6/2004 | Weise |
| 2009/0294006 A1 | 12/2009 | Hrabal |
| 2012/0175033 A1* | 7/2012 | Lavialle ............... C08K 3/04 152/526 |
| 2014/0174621 A1 | 6/2014 | Hinque et al. |
| 2015/0059952 A1 | 3/2015 | Benedict et al. |
| 2015/0059953 A1 | 3/2015 | Welter et al. |
| 2015/0122389 A1* | 5/2015 | Durr ............... B60C 23/12 152/450 |
| 2015/0122390 A1* | 5/2015 | Durr ............... F16K 15/207 152/450 |
| 2016/0176243 A1 | 6/2016 | Lin |
| 2017/0144492 A1 | 5/2017 | Lamgaday et al. |
| 2017/0144493 A1 | 5/2017 | Lamgaday et al. |
| 2017/0217260 A1 | 8/2017 | Lin |

FOREIGN PATENT DOCUMENTS

| | | |
|---|---|---|
| EP | 2746074 A1 | 6/2014 |
| EP | 2868498 A1 | 5/2015 |
| EP | 2889162 | 9/2016 |
| RU | 2106978 | 3/1998 |
| SE | 183890 | 5/1963 |
| WO | 2003049958 | 6/2003 |
| WO | 2005012009 A1 | 11/2007 |
| WO | 2007134556 | 11/2007 |
| WO | 2010008338 | 1/2010 |

* cited by examiner

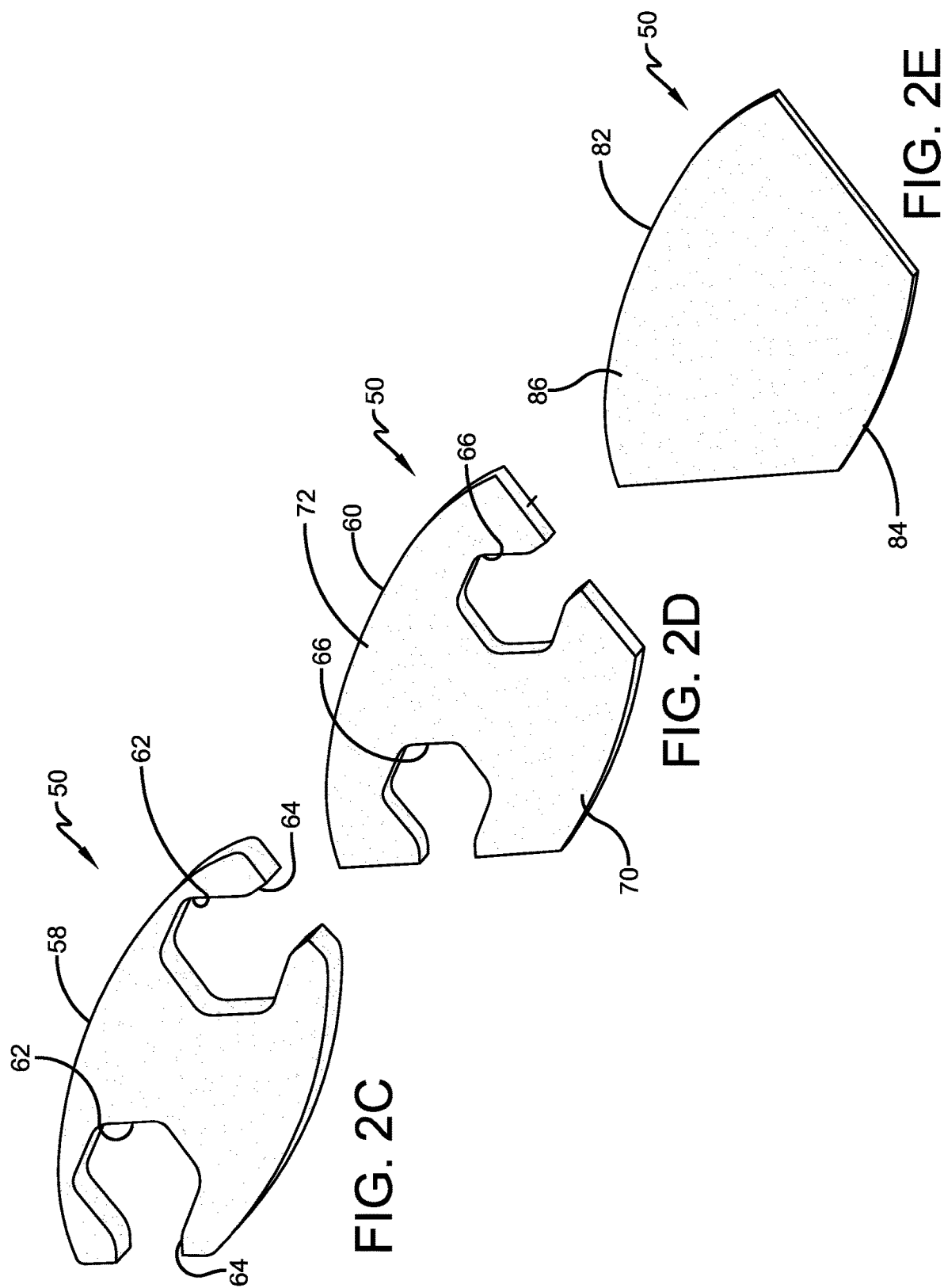

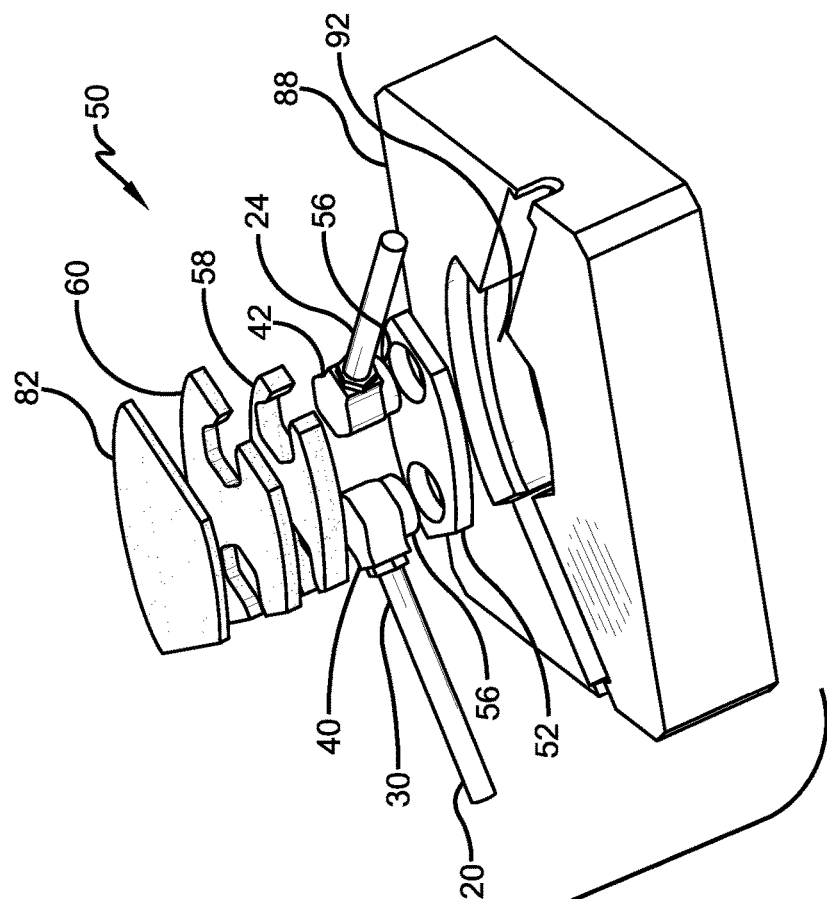
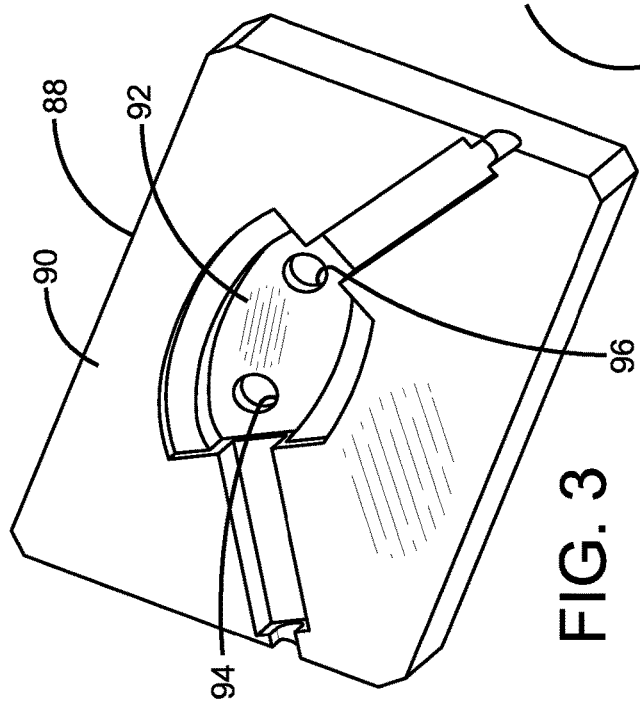

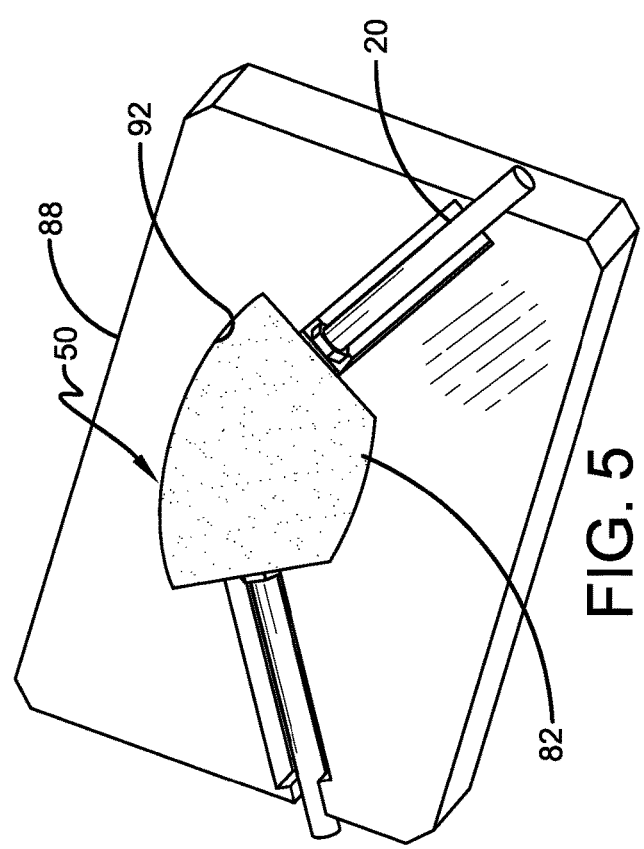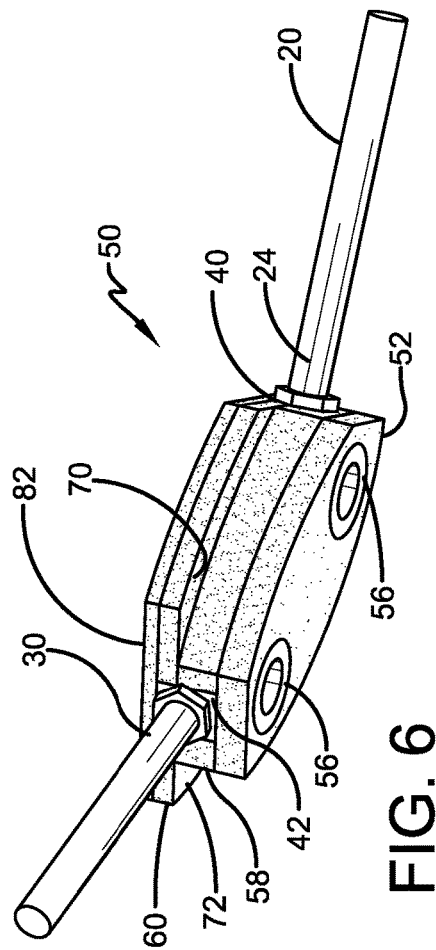

MOUNTING MEMBER FOR AN AIR MAINTENANCE TIRE

FIELD OF THE INVENTION

The invention relates to air maintenance tire systems, which are systems that maintain appropriate air pressure within a pneumatic tire. More specifically, the invention relates to pneumatic connectors of a valve stem-based air maintenance tire system. The invention is directed to a mounting member for pneumatic connectors, which is formed with a layered structure that provides improved characteristics, and optionally includes a thermally conductive material in one or more of the layers.

BACKGROUND OF THE INVENTION

Conventional pneumatic tires are designed to perform for relatively long periods of time. In many cases, automobile tires are now expected to have a useful service life of 30,000, 50,000 or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires may repeatedly become underinflated. Accordingly, drivers must in turn repeatedly act to maintain recommended air pressures in the vehicle tires to avoid reduced fuel economy, tire life, and/or vehicle braking and handling performance. Tire pressure monitoring systems (TPMS) are automated systems that have been proposed to warn drivers when the air pressure in the vehicle tires is significantly low. Such systems, however, remain dependent upon a driver taking remedial action, when warned, to re-inflate a tire to the recommended pressure. It had thus been desirable in the prior art to incorporate an air maintenance feature within a pneumatic tire that would maintain a predetermined or recommended air pressure without requiring driver intervention.

To this end, air maintenance tire (AMT) systems have been developed. An AMT system typically includes one or more pumps or pumping assemblies that act to increase the air pressure in the vehicle tires as needed. An example of one such system is a valve stem-based air maintenance tire system described in U.S. patent application Ser. No. 14/946,005, which is owned by the same Assignee as the present invention, that is, The Goodyear Tire & Rubber Company.

In such AMT systems, and particularly valve stem-based AMT systems, an annular air tube is disposed in a sidewall of the tire and is sequentially flattened or squeezed by the tire footprint as the tire rotates, which directs air to a valve housing. The valve housing is disposed within a wheel rim and is fluidly connected to a tire valve stem, which in turn is in fluid communication with the tire cavity. To enable the fluid communication of air from the annular air tube to the valve housing, one or more connecting tubes extend between the annular air tube and the valve housing. Pneumatic connectors fluidly connect the annular air tube to the connecting tubes, and are housed within a mounting member that is secured to the sidewall of the tire in order to provide a secure connection point.

The mounting member is often referred to as a dome. The dome is an important part of a valve-stem based AMT system, as it provides a stable platform and protection for the fluid connection between the annular air tube and the connecting tubes. In the prior art, the dome was formed by cutting pieces of a single elastomeric compound and inserting the pieces into a mold, which was then heated. Such a structure may not always be capable of being formed consistently or repeatably, and/or may not cure uniformly. In addition, it may be difficult to select a single elastomeric compound to satisfy multiple desirable characteristics for the dome, such as high adhesion and abrasion resistance.

As a result, there is a need in the art for a mounting member that provides consistent and repeatable forming, uniform curing, and the capability to satisfy multiple desirable characteristics.

SUMMARY OF THE INVENTION

According to an aspect of an exemplary embodiment of the invention, a mounting member for an air maintenance tire is provided. The tire includes a sidewall that is formed with a groove for receiving an air tube and a recess for receiving at least one pneumatic connector that is in fluid communication with the air tube. The mounting member includes a plurality of layers, in which the layers are in stacked alignment with one another. The plurality of layers includes at least an axially outward layer and an axially inward layer. The mounting member is received in the recess and secured to the tire sidewall, thereby securing the position of the at least one pneumatic connector.

According to an aspect of another exemplary embodiment of the invention, a method of forming a mounting member for an air maintenance tire is provided. The method includes the steps of providing a tire that includes a sidewall and is formed with a groove for receiving an air tube and a recess for receiving at least one pneumatic connector that is in fluid communication with the air tube. A plurality of layers of material are provided and are stacked in alignment with one another. The layers are placed into a mold and the mold is located over the recess in the tire sidewall. The mold is heated and the layers are cured to form the mounting member in the recess, thereby securing the position of the at least one pneumatic connector.

BRIEF DESCRIPTION OF THE DRAWINGS

The invention will be described by way of example and with reference to the accompanying drawings, in which:

FIG. 2C is a perspective view of another component of the mounting member shown in FIG. 1;

FIG. 2D is a perspective view of another component of the mounting member shown in FIG. 1;

FIG. 2E is a perspective view of another component of the mounting member shown in FIG. 1;

FIG. 3 is a perspective view of a mold employed in the forming of the mounting member for an air maintenance tire of the present invention;

FIG. 4 is an exploded perspective view of the components shown in FIGS. 2A through 2E as inserted in the mold shown in FIG. 3;

FIG. 5 is a perspective view of the components shown in FIGS. 2A through 2E as inserted in the mold shown in FIG. 3;

FIG. 6 is an assembled perspective view of the components shown in FIGS. 2A through 2E;

Similar numerals refer to similar parts throughout the drawings.

DETAILED DESCRIPTION OF THE INVENTION

It is to be understood that the term inboard or inboardly is referred to herein as a direction corresponding to the axially inner surface or side of a tire, and the term outboard or outboardly is referred to herein as a direction corresponding to the axially outer surface or side of a tire. The term axially inwardly refers to an axial direction that is toward the center plane of a tire, and the term axially outwardly refers to an axial direction that is away from the center plane of a tire. The term radially inwardly refers to a radial direction that is toward the central axis of rotation of a tire, and the term radially outwardly refers to a radial direction that is away from the central axis of rotation of a tire.

Figure 1:
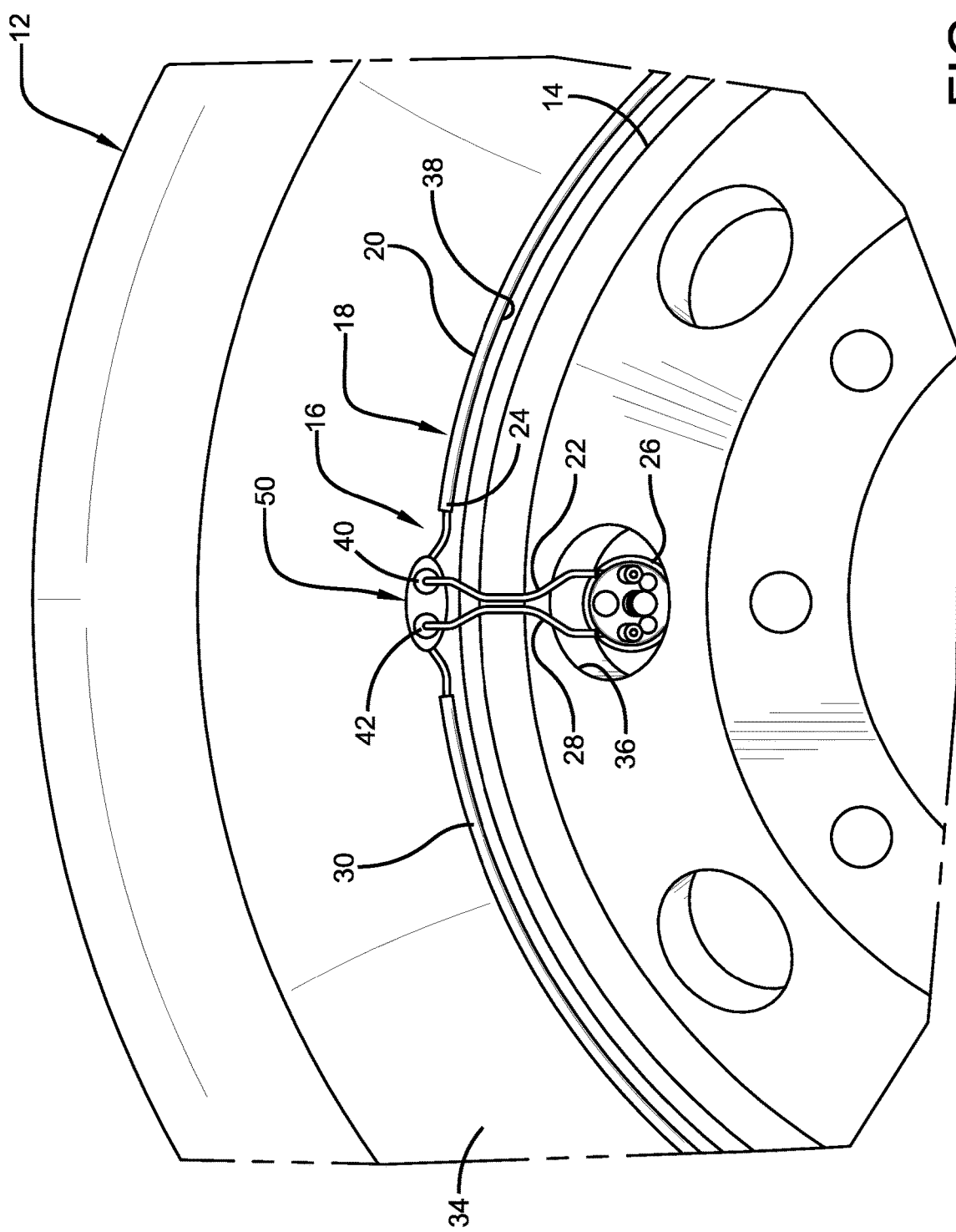
FIG. 1 is a fragmentary elevational view of a side of a tire including components of a valve stem-based air maintenance tire system and an exemplary embodiment of the mounting member of the present invention.
Figure 2A:
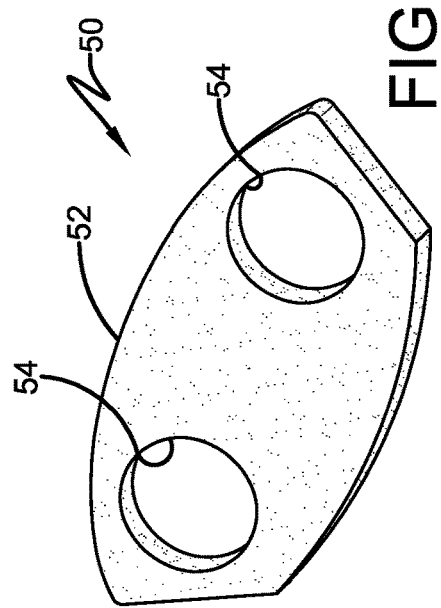
FIG. 2A is a perspective view of a component of the mounting member shown in FIG. 1.
Figure 2B:
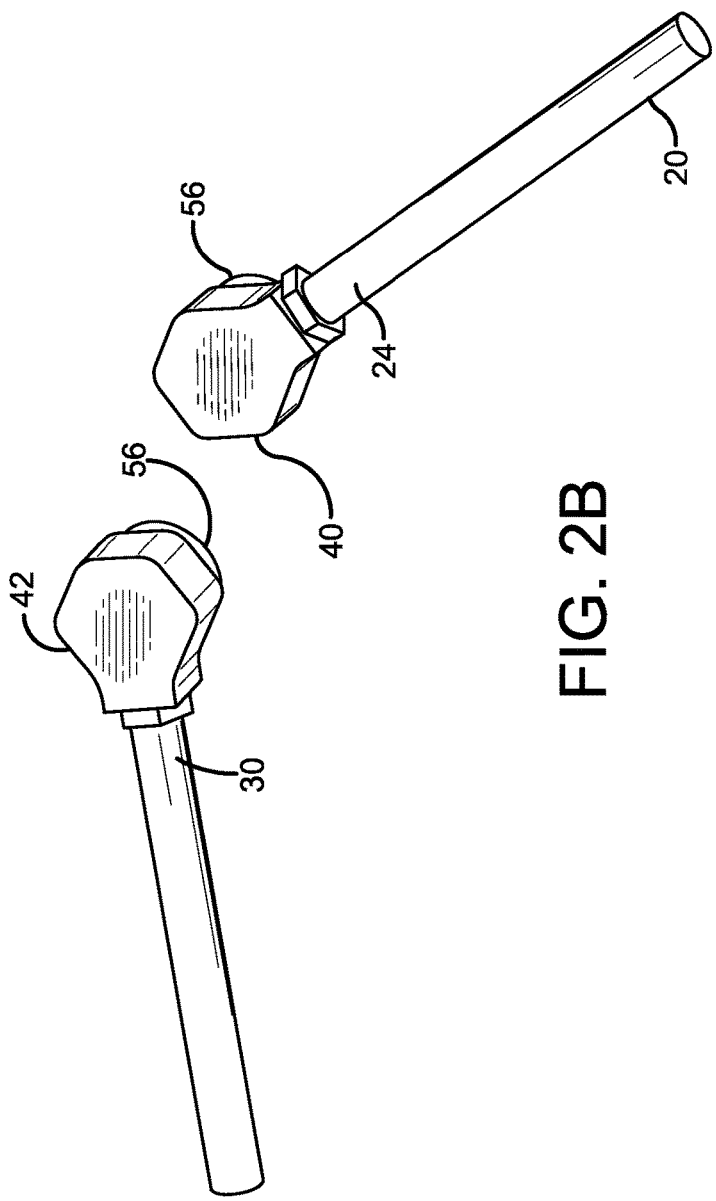
FIG. 2B is a perspective view of components of the air maintenance tire shown in FIG. 1.

Turning to FIG. 1, a tire 12 is mounted on a rim 14 in a conventional manner as known to those skilled in the art and defines a cavity (not shown). An exemplary air maintenance tire system, such as a valve stem-based air maintenance tire system, is indicated at 16. The air maintenance tire system 16 includes a peristaltic pump assembly 18. The peristaltic pump assembly 18 includes an annular air tube 20 that is received in an annular groove 38 formed in a sidewall 34 of the tire 12 and/or rim 14, and in turn encloses an annular passageway (not shown).

A first connecting tube 22 pneumatically connects to a first end 24 of the annular air tube 20 and fluidly connects the first end of the annular air tube to a valve housing 26 of the pump assembly 18. A second connecting tube 28 pneumatically connects to a second end 30 of the annular air tube 20 and fluidly connects the second end of the annular air tube to the valve housing 26.

When the tire 12 rotates under load along a ground surface, the annular air tube 20 is sequentially flattened or squeezed at the tire footprint. The sequential flattening of the annular air tube 20 and its passageway, segment by segment, directs air to the valve housing 26. A tire valve stem (not shown), including a check valve, is fluidly connected to the valve housing 26 and is in fluid communication with the tire cavity. When the air pressure is sufficient against the check valve and the air pressure within the tire cavity is below a set pressure level, air passes into the tire cavity. When the air pressure level within the tire cavity is at or above the set pressure, the check valve closes and air from the pump assembly 18 is vented by a relief valve in the valve housing 26 to atmosphere.

As seen in FIG. 1, the valve housing 26 of the pump assembly 18 is disposed within the rim 14. The connecting tubes 22 and 28 pass through an opening 36 formed in the rim 14 and extend to the air tube 20. More particularly, the first connecting tube 22 extends to a first pneumatic fitting or connector 40, which fluidly connects the first connecting tube to the first end 24 of the air tube 20. The second connecting tube 28 extends to a second pneumatic fitting or connector 42, which fluidly connects the second connecting tube to the second end 30 of the air tube 20.

A mounting member secures the position of the first and second connectors 40 and 42 at the tire sidewall 34, and thus secures the fluid connection of the connecting tubes 22 and 28 to the air tube 20. An exemplary embodiment of the mounting member of the present invention is indicated at 50 and will be referred to as a dome for the purpose of convenience. The dome 50 is a fairly rigid elastomer or polymer mounting member and is secured to the sidewall 34 of the tire 12, as will be described in greater detail below.

The dome 50 includes a layered structure. More particularly, turning now to FIGS. 2A through 2E, 4 and 6, the dome 50 includes more than one layer, referred to herein as a plurality of layers, in which the layers are in stacked alignment with one another. For example, the dome 50 preferably includes an axially outward layer 52 that forms the outer surface of the dome, which is at the outer surface of the tire sidewall 34. The outward layer 52 preferably is formed with a pair of openings 54, each one of which receives and positions a respective outward end 56 of the first and second connectors 40 and 42. The outward layer 52 is also preferably formed of an abrasion-resistant elastomer, thereby providing protection to the dome 50 from road hazards and environmental conditions.

The dome 50 also includes one or more middle layers 58 and 60. The first middle layer 58 is adjacent the outward layer and preferably is formed with a pair of openings 62, each one of which includes a slot 64. The openings 62 enable the first middle layer 58 to be positioned about the first and second connectors 40 and 42, while the slots 64 provide a clearance that ensures the first middle layer is easily inserted about the connectors while not interfering with the pneumatic connection of the connectors to the air tube 20.

The second middle layer 60 is adjacent the first middle layer 58 and preferably is formed with a pair of openings 66, each one of which includes a slot 68. The openings 66 enable the second middle layer 60 to be positioned about the first and second connectors 40 and 42, while the slots 68 provide a clearance that ensures the second middle layer is easily inserted about the connectors while not interfering with the pneumatic connection of the connectors to the air tube 20. The second middle layer 60 also is preferably formed with a radially-inwardly extending edge 70 and a radially-outwardly extending edge 72, each of which extends past the respective radial edges of the outward layer 52 and the first middle layer 58. The edges 70 and 72 of the second middle layer 60 enable mechanical engagement with a feature formed in the tire sidewall 34.

Figure 7:
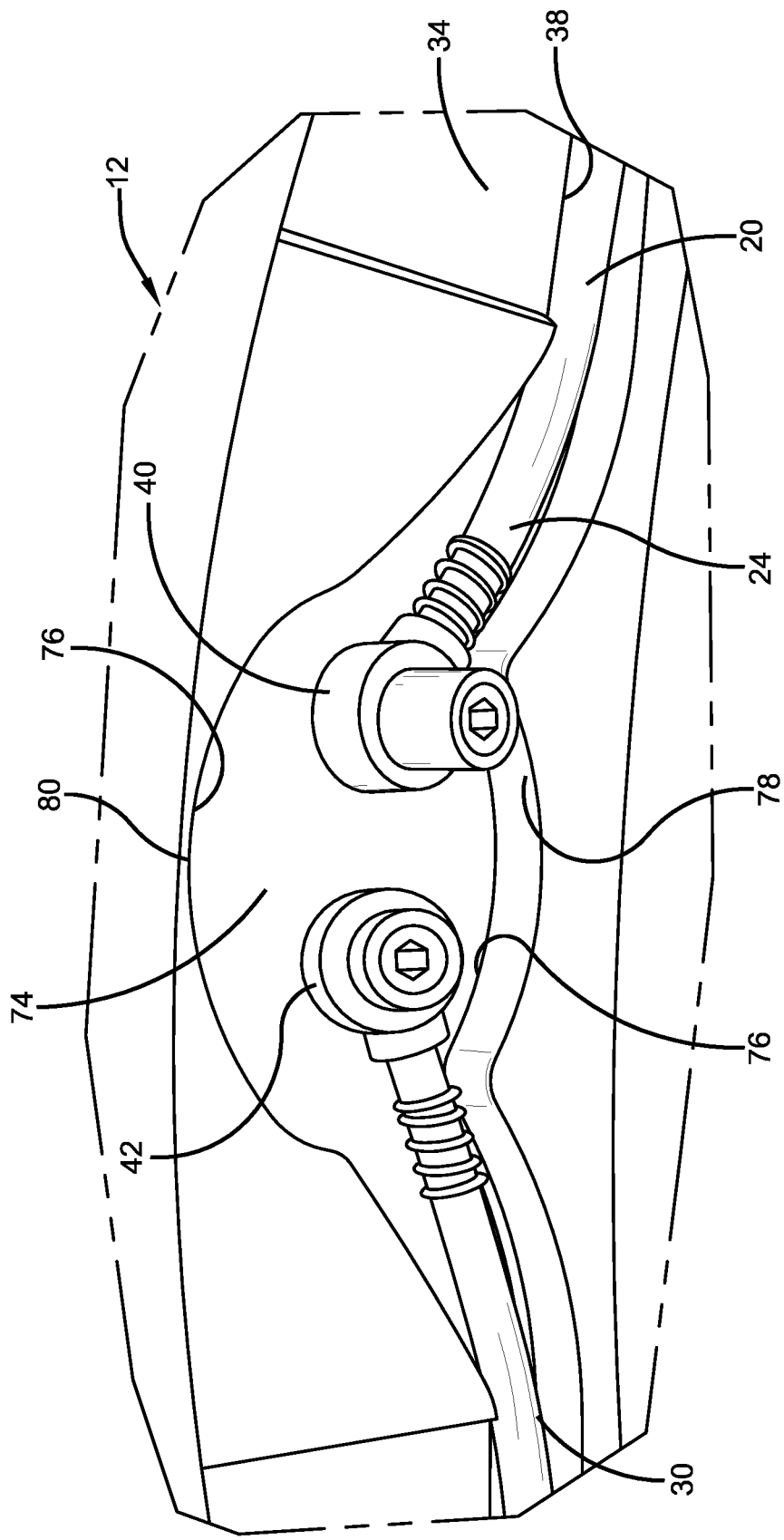
FIG. 7 is a fragmentary perspective view of a tire sidewall including a recess formed therein for receiving the mounting member and components of the pumping assembly.

More particularly, as shown in FIG. 7, a recess 74 is formed in the tire sidewall 34 at a predetermined point along the annular groove 38. The first connector 40 and the second connector 42, and thus the dome 50, are each received in the recess 74. Preferably, a feature such as an undercut 76 is formed about the radially inward periphery 78 and the radially outward periphery 80 of the recess 74 to enable mechanical engagement of the second middle layer edges 70 and 72 and thus the dome 50 with the tire sidewall 34. In this manner, the dome 50 seats in the recess 74 and is secured to the tire sidewall 34.

Referring now to FIGS. 2E, 4 and 6, the dome 50 includes an axially inward layer 82. The inward layer 82 preferably is formed without openings to enable maximum surface contact with the tire sidewall surface in the recess 74, thereby enabling optimum attachment of the dome 50 to the tire sidewall 34. The inward layer 82 also preferably includes a radially-inwardly extending edge 84 and a radially-outwardly extending edge 86, which align with the respective edges 70 and 72 of the second middle layer 60 to provide further mechanical engagement of the dome 50 with the recess undercut 76 in the tire sidewall 34. In addition, the inward layer 82 preferably is formed of an elastomer that promotes high adhesion, thereby providing further secure mounting of the dome 50 to the tire sidewall 34.

It is to be understood that the dome 50 may include two, three, four or more layers without affecting the overall concept or operation of the invention. It is to be further understood that each layer of the dome 50 may be formed with particular features or attributes to promote desired characteristics of the dome, depending on specific design considerations.

Preferably, the layers 52, 58, 60 and 82 of the dome 50 are formed into an integral unit by molding, adhesion, or the like. For example, turning now to FIGS. 3 through 6, a mold 88 includes an interior surface 90 that is formed with a cavity 92. A first opening 94 extends through the mold 88 from the cavity 92 and receives the first connector 40, while a second opening 96 extends through the mold from the cavity and receives the second connector 42. The cavity 92 is shaped to receive the layers 52, 58, 60 and 82 of the dome 50, the first and second connectors 40 and 42, and the respective ends 24 and 30 of the air tube 20.

Preferably, the axially outward layer 52 is inserted into the cavity 92, followed by the connectors 40 and 42. The outward end 56 of each connector 40 and 42 passes through a respective one of the openings 54 formed in the outward layer 52 and is secured in a respective one of the cavity openings 94 and 96. The first middle layer 58 is inserted into the cavity 92 between and about the connectors 40 and 42 against the outward layer, and the second middle layer 60 is inserted into the cavity between and about the connectors against the first middle layer. The axially inward layer 82 is then inserted into the cavity 92 against the second middle layer 60.

Figure 8:
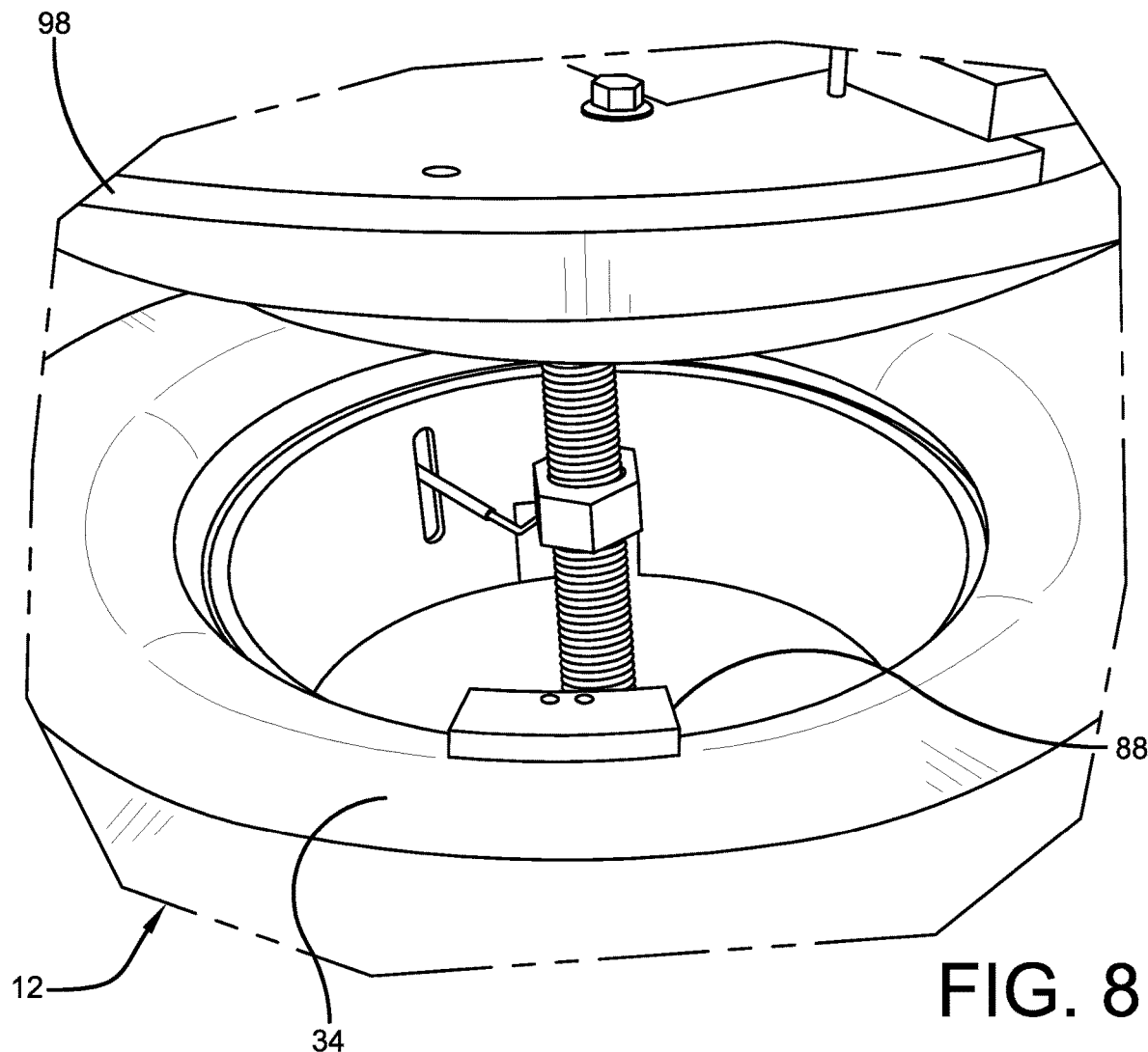
FIG. 8 is a fragmentary perspective view of the mold shown in FIG. 5 as disposed on the tire shown in FIG. 1 and in a press.

As shown in FIG. 8, the mold 88 is positioned on the surface of the tire sidewall 34 over the recess 74 (FIG. 7). The mold 88 preferably is secured in position against the tire sidewall 34 by mechanical means, such as fasteners or dowel pins. A platen 98 is placed into contact with the mold 88 to provide pressure and/or heat to the mold to cure the dome 50 in the recess 74.

To enable the dome 50 to be formed consistently and repeatably, each layer 52, 58, 60 and 82 preferably is pre-cut cut from a suitable elastomer or polymer stock. For example, each layer 52, 58, 60 and 82 may be die cut from a stock material. In addition, each pre-cut layer 52, 58, 60 and 82 may be inserted into the mold 88 separately as described above, or they may be assembled and then inserted into the mold as a unit.

Figure 9:
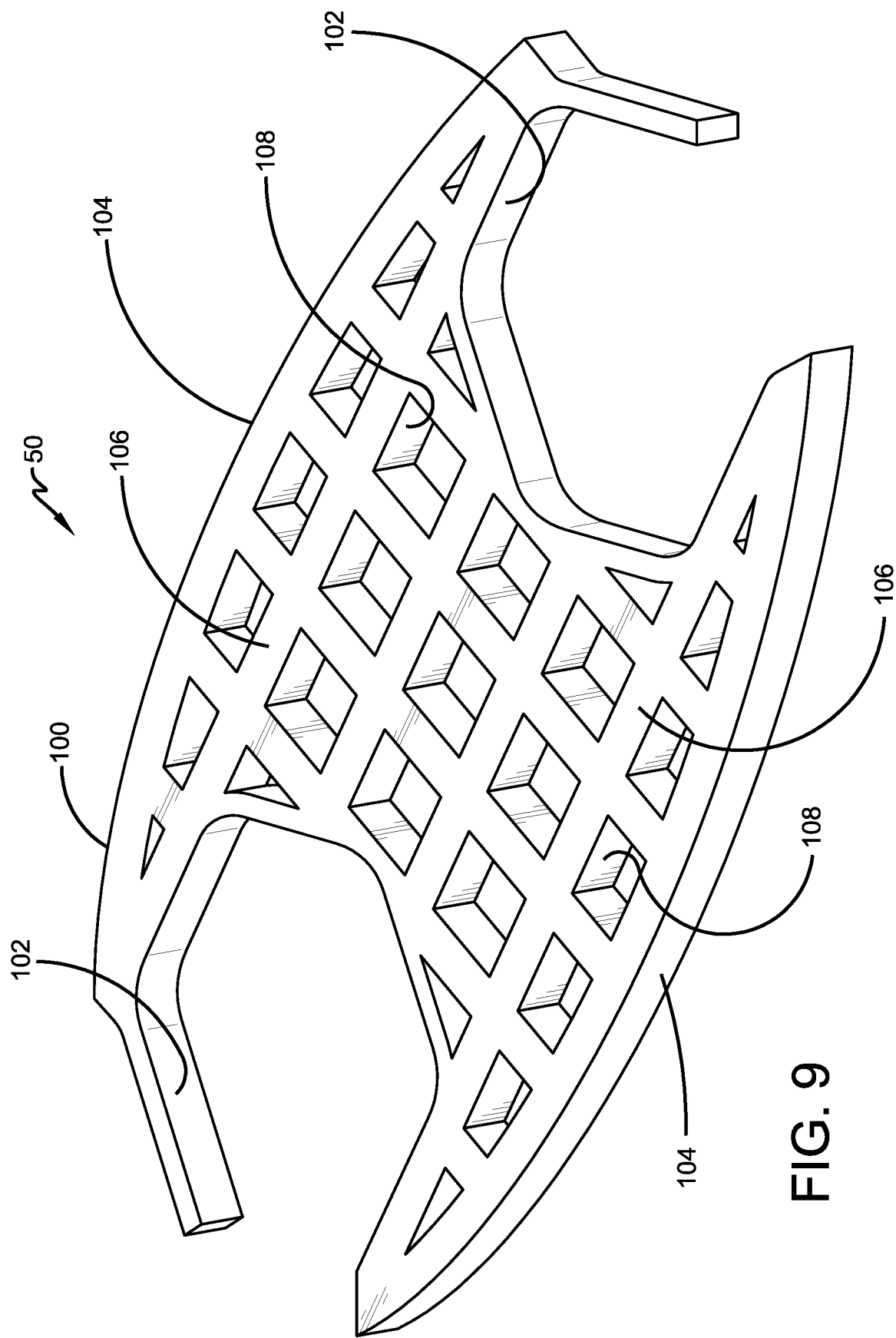
FIG. 9 is a perspective view of a thermally conductive material component of an exemplary embodiment of the mounting member for an air maintenance tire of the present invention.
Figure 10:
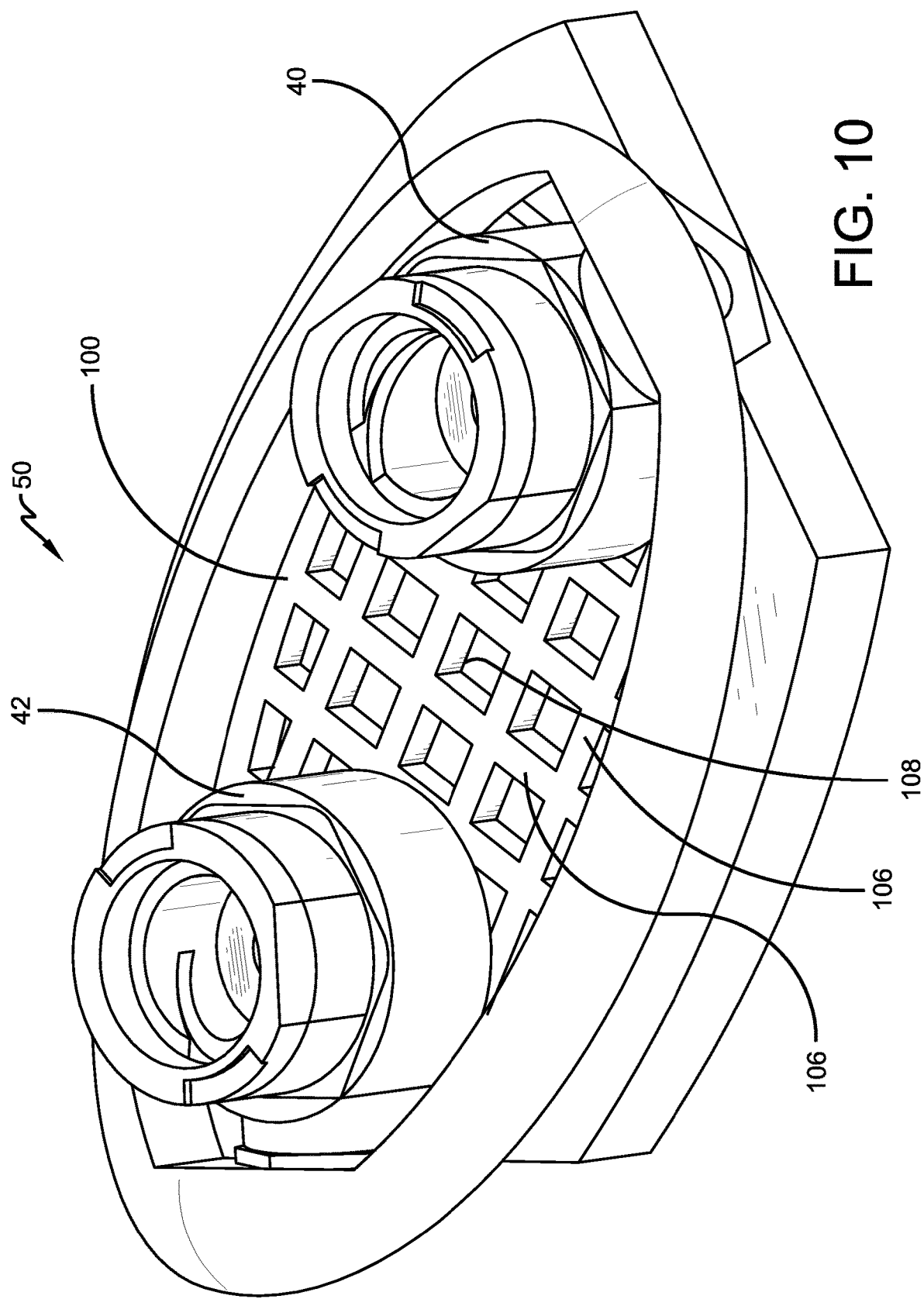
FIG. 10 is a fragmentary perspective view of an upper or top surface of the component shown in FIG. 8, including pneumatic connectors.
Figure 11:
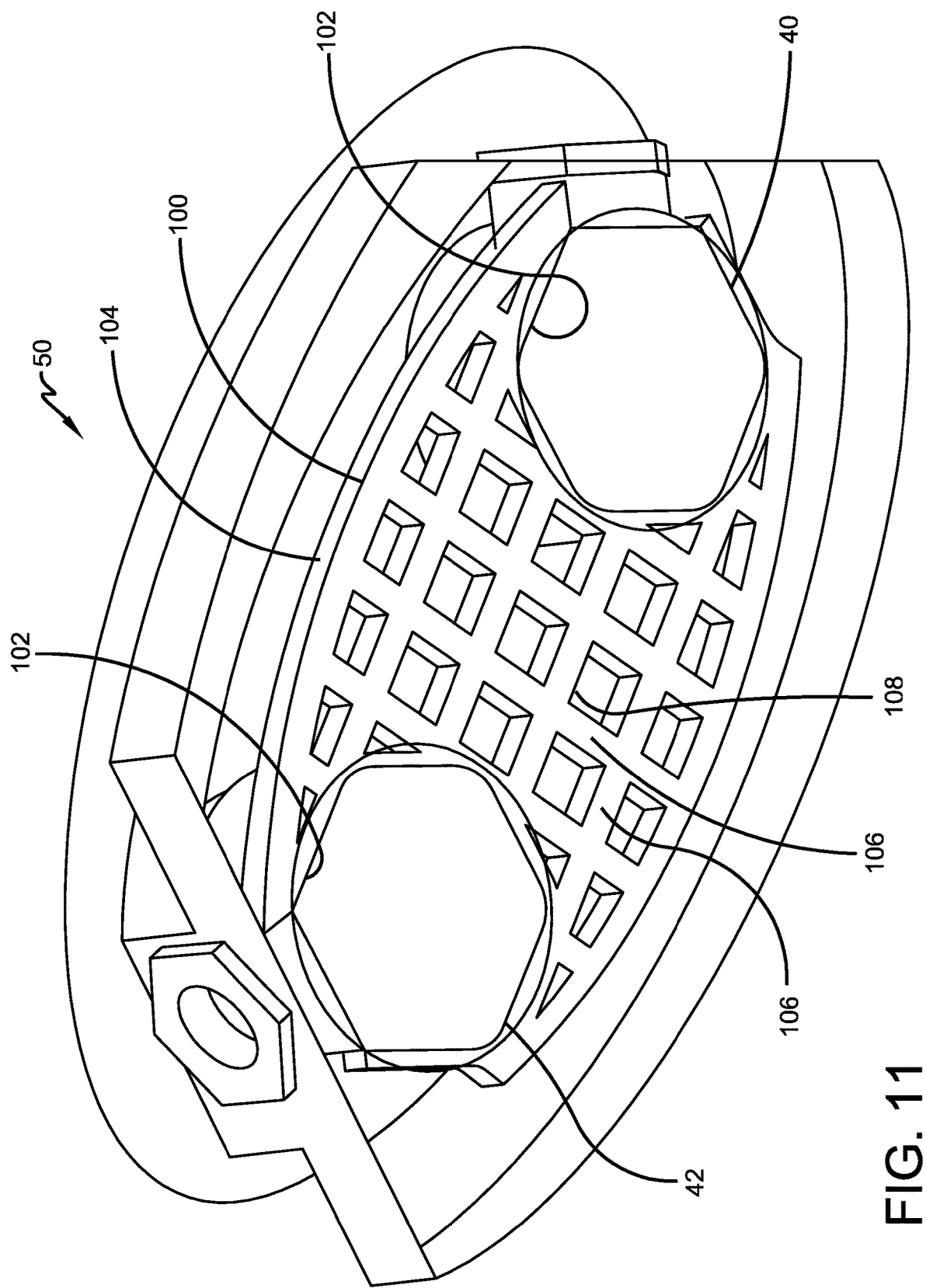
FIG. 11 is a fragmentary perspective view of a lower or bottom surface of the components shown in FIG. 10.

Turning now to FIGS. 9 through 11, one or more of the layers of the dome 50 may be or may include a thermally conductive material, such as a mesh 100. When the dome 50 is cured as described above, it is desirable to promote uniform and consistent curing of the dome layers. Because the connectors 40 and 42 are preferably formed of a rigid material, such as brass, copper, steel or other metal, or of a rigid, high-melting point plastic or composite, heat from the mold 88 may readily be conducted to the area of the dome 50 adjacent the connectors. However, the heat may not be conducted as well in areas of the dome 50 that are more distant from the connectors 40 and 42 and/or the surface of the mold 88.

To provide desirable thermal conductivity, and thus promote uniform and consistent curing, a selected layer of the dome 50 optionally includes the mesh 100. For example, one of the first middle layer 58 and the second middle layer 60 (FIG. 6) may be replaced by or include the thermally conductive mesh 100. The mesh 100 is formed of a thermally conductive material, such as a thermally conductive polymer, and extends across the cross section of the dome 50.

The mesh 100 is formed with a pair of openings 102, each one of which receives and engages a respective one of the first and second connectors 40 and 42. The engagement of the mesh 100 with the first and second connectors 40 and 42 secures the position of the mesh within the dome 50 and promotes the transfer of heat from the connectors across the dome. Preferably, portions of the perimeter 104 of the mesh 100 are disposed against or adjacent the mold 88 to further promote the transfer of heat from the mold across the dome 50.

To enable the flow of elastomer into and through the mesh 100, the mesh is preferably formed with a grid-like structure that includes ribs 106 and openings 108. With this structure, the heat distribution in the dome 50 is improved, thereby promoting uniform and consistent curing of the dome.

The above-described layered structure of the dome or mounting member 50 for an air maintenance tire of the present invention provides consistent and repeatable forming. The layered structure also enables the dome or mounting member 50 to include different materials with specific desirable characteristics, such an outer layer that promotes abrasion resistance and an inner layer that promotes adhesion. Moreover, the dome 50 optionally includes a thermally conductive material to promote uniform curing.

The present invention also includes a method of forming a mounting member 50 in an air maintenance tire. The method includes steps in accordance with the description that is presented above and shown in FIGS. 1 through 11.

It is to be understood that the structure of the above-described mounting member for an air maintenance tire may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A mounting member for an air maintenance tire, the tire including a sidewall being formed with a groove for receiving an air tube and a recess for receiving at least one pneumatic connector that is in fluid communication with the air tube, the mounting member comprising:
   a plurality of layers, the layers being in stacked alignment with one another;
   the plurality of layers including at least an axially outward layer and an axially inward layer;

the plurality of layers further comprising two layers disposed between the outward layer and the inward layer; and the mounting member being received in the recess and secured to the tire sidewall thereby securing the position of the at least one pneumatic connector.

2. The mounting member for an air maintenance tire of claim 1, wherein the outward layer is formed with at least one opening to receive an outward end of the at least one pneumatic connector.

3. The mounting member for an air maintenance tire of claim 1, wherein the outward layer is formed of an abrasion-resistant elastomer.

4. The mounting member for an air maintenance tire of claim 1, wherein at least one of the inward layer and the layer being disposed between the outward layer and the inward layer is formed with edges that engage a feature formed in the tire sidewall.

5. The mounting member for an air maintenance tire of claim 1, wherein the inward layer is formed of an elastomer that promotes adhesion.

6. The mounting member for an air maintenance tire of claim 1, wherein the layers are formed into an integral unit by at least one of molding and adhesion.

7. The mounting member for an air maintenance tire of claim 1, wherein the layers are pre-cut before being disposed in stacked alignment.

8. A mounting member for an air maintenance tire, the tire including a sidewall being formed with a groove for receiving an air tube and a recess for receiving at least one pneumatic connector that is in fluid communication with the air tube, the mounting member comprising:

a plurality of layers, the layers being in stacked alignment with one another;

the plurality of layers including at least an axially outward layer and an axially inward layer;

a thermally conductive material being disposed in the plurality of layers; and the mounting member being received in the recess and secured to the tire sidewall thereby securing the position of the at least one pneumatic connector.

9. The mounting member for an air maintenance tire of claim 8, wherein the thermally conductive material is incorporated into at least one of the layers.

10. The mounting member for an air maintenance tire of claim 8, wherein the thermally conductive material includes a thermally conductive mesh.

11. The mounting member for an air maintenance tire of claim 10, wherein the mesh is formed with a grid-like structure that includes ribs and openings.

12. The mounting member for an air maintenance tire of claim 8, wherein the thermally conductive material includes a thermally conductive polymer.

13. The mounting member for an air maintenance tire of claim 8, wherein the thermally conductive material is formed with at least one opening to opening to engage the at least one pneumatic connector.

* * * * *